May 28, 1963
L. F. STONE
3,091,301
AUTOMATIC FEED RATE COMPENSATION FOR
AUTOMATIC WEIGHING SYSTEM
Filed Nov. 24, 1961
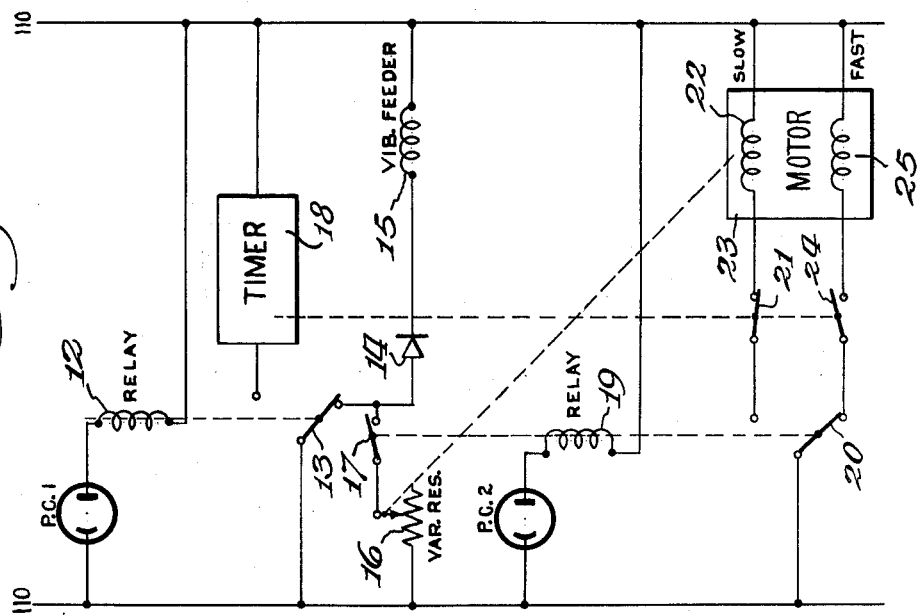
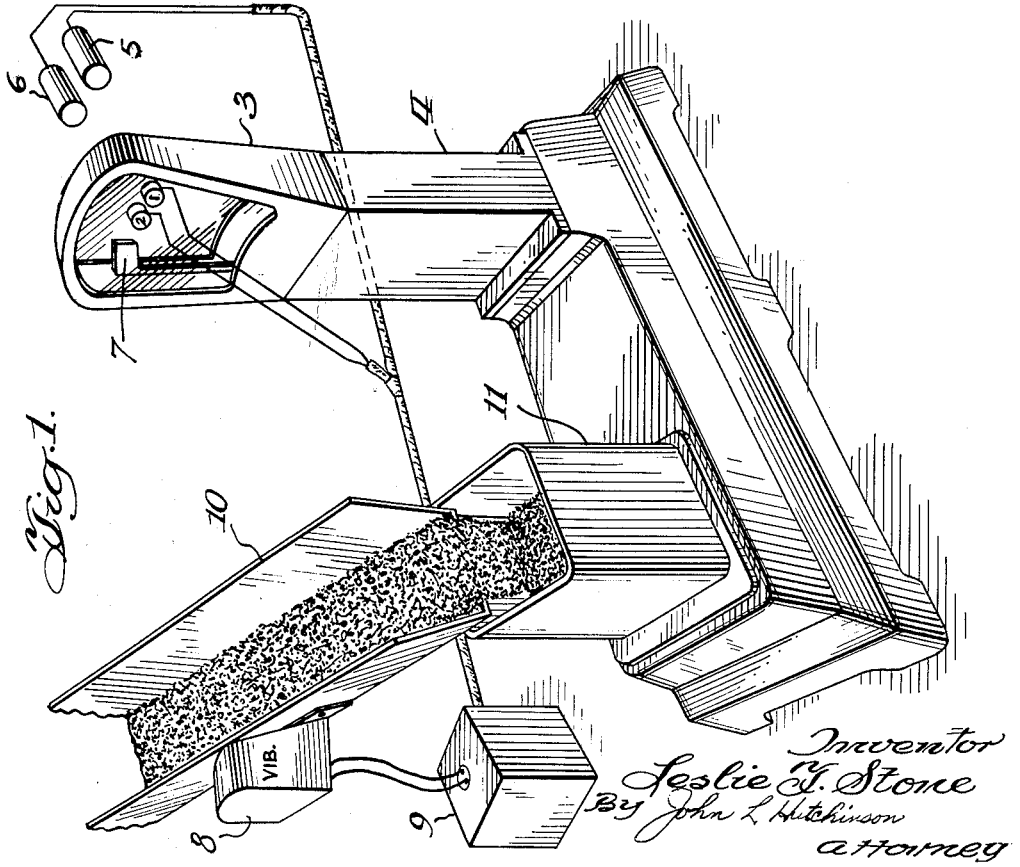
Inventor
Leslie F. Stone
By John L. Hitchinson
Attorney

3,091,301
AUTOMATIC FEED RATE COMPENSATION FOR AUTOMATIC WEIGHING SYSTEM
Leslie F. Stone, Bellwood, Ill., assignor to The Richardson Company, Melrose Park, Ill., a corporation of Ohio
Filed Nov. 24, 1961, Ser. No. 154,575
4 Claims. (Cl. 177—1)

This invention relates to a controlled weighing system and more particularly relates to feed rate compensation equipment and method for automatic repeated weighing of a predetermined amount of material.

In batching of raw materials or in packaging of bulk materials, either solid or liquid, the significance of measuring a precise amount is self-evident. Only by fast, accurate, automatic weighing is it feasible to achieve readily reproducible results thereby eliminating or reducing waste by reason of too much or too little raw material and attendant rejected finished products.

In the usual industrial weighing installation there is storage space for supplying material to be weighed, a means for moving that material to the scale, and a means for controlling the flow of material which includes dribbling the final amount of material to the scale. By these means, using a fast feed rate to approach the end point and then a slow or dribble rate to complete the weighing, a quite accurate final weight is quickly obtained. Conversely, without a slow or dribble feed rate it is difficult to weigh accurately except when the feed rate can be maintained very constant. Constancy in feed or flow rate, however, is not as simple as it might seem. Many materials are not of uniform particle size and even some materials of a relatively uniform particle size, and liquid as well, are affected in their flow properties by changes in environmental conditions such as temperature, pressure, humidity or ageing. For example, granulated sugar may cake or fuse according to atmospheric conditions in which case its flow characteristics are altered. It can, therefore, be seen that in any given large amount of bulk material, whether it be liquid or solid with either uniform or widely varying particle size, there will be changes in its nature that affect weighing accuracy.

Accordingly, it is an object of this invention to provide a system for sensing variations in feed rate that will permit optimum weighing.

A further object is to provide a system for sensing variations in feed rate that will permit optimum weighing without any increase in weighing cycle time.

These and other related objects are achieved by this invention wherein a timer-controlled power means is linked to a variable current regulator controlling power to the means for feeding material to the weighing device.

Further description of the invention may be had by reference to the accompanying drawings in which FIG. 1 shows a schematic arrangement of a tower scale, feed mechanism and appropriate controls. FIG. 2 is a wiring diagram showing the various components of the system with electrical and mechanical connections between the components.

With specific reference to FIG. 1 in which the electric power source is not shown, photoelectric cells 1 and 2 are mounted on scale head 3 of tower scale 4. The light-sensitive portion of cells 1 and 2 are directly opposed to light sources 5 and 6, respectively, the cells being placed on one side of the scale head, the lights being placed on the other side, so that motion of scale pointer 7 can consecutively expose cells 1 and 2 to corresponding light sources 5 and 6. Photoelectric cell 1, being in fixed spaced relationship with the zero reading of scale 4, establishes the point at which dribble or slow feed is begun. Up to the moment that photoelectric cell 1 is exposed to light source 5 by movement of scale pointer 7, vibratory feeder 8 operated by controller 9 produces rapid movement of conveyor 10 and fast feeding of material into receptacle 11. At the moment that photoelectric cell 1 is exposed by movement of pointer 7, controller 9 retards the motion of vibratory feeder 8 and conveyor 10 to slow the feed rate of the material being weighed into receptacle 11. Operating in the same manner when occluded from light source 6 by scale pointer 7, photoelectric cell 2 through controller 9 stops the feeder 8 and conveyor 10 with the contents of receptacle 11 at full weight.

Fixing the relative positions of the two photoelectric cells establishes the weight of material to be fed at a dribble rate. Having due regard for the degree of accuracy required and the variability of the material the weight per unit of time is determined which, in turn, fixes the optimum dribble or final feed time.

The circuitry and related equipment is described by reference to FIG. 2 in which a source of 110 volts is shown, the power being applied manually or automatically by a switch not shown. At the beginning of a weighing cycle the circuit through photoelectric cell 1 is open by reason of increased internal resistance when its light source, light 5, is darkened by pointer 7. Accordingly, there is no current through relay 12, switch 13 closing the circuit through rectifier 14 and vibratory feeder 15 so that material is fed rapidly onto the scale. As the scale is thus loaded, the scale pointer reaches a position where it permits light to shine on photoelectric cell 1, the internal resistance in the cell thereby being lowered which allows current to pass through and energize relay 12. Thereupon the circuit through rectifier 14 and vibratory feeder 15 is interrupted by the opening of switch 13. At this point a circuit exists through variable resistor 16, normally closed switch 17, rectifier 14 and vibratory feeder 15 which lessens the feed rate by reason of the presence of variable resistor 16 reducing current in the circuit.

Opening of switch 13 in the manner described is immediately followed by its being moved to close the circuit through timer 18, the current energizing the timer which defines a predetermined period for dribble or slow feed rate filling of the receptacle on the scale. After an interval of time depending on the dribble feed rate, the scale pointer has moved far enough to permit light to impinge on photoelectric cell 2. This produces a reduced internal resistance in cell 2 thereby energizing relay 19 to move switch 20 from its normally closed position shown to close the circuit through switch 21, simultaneously opening switch 17 to stop vibratory feeder 15 by interrupting current flow to it.

If vibratory feeder 15 is stopped by the opening of switch 17 at the same instant that the predetermined period for dribble feed set by timer 18 ends, the setting of dribble feed rate is proper and the feeder has been feeding as set. This opening of switch 17 would then coincide with the opening of switch 21 by timer 18.

In the situation where material is feeding too fast, the scale pointer would move from a position first permitting light to strike photoelectric cell 1 to a position then permitting light to impinge on photoelectric cell 2 before the predetermined period for dribble or slow feed set by timer 18 had elapsed. In such a case, relay 19 would be energized and would move switch 20 to close the circuit through normally closed switch 21 and thus pass current through the slow coil 22 in motor 23. Through a mechanical linkage, slow coil 22 would increase the resistance setting of variable resistor 16 to decrease the amount of current flowing to rectifier 14 and vibratory feeder 15. The longer the period of time that the circuit is complete through switch 21 and slow coil 22, the more resistance is added by way of variable resistor 16 to further reduce current to vibratory feeder 15. That period of time is finally concluded, of course, at the conclusion of the predetermined period set by timer 18 at which point switch 21 is opened as mentioned above.

In the converse, if material has been feeding too slowly, the scale pointer would not traverse the distance on the scale face between photoelectric cells 1 and 2 before the predetermined period set by timer 18 had elapsed. Thus, timer 18 in opening switch 21 would simultaneously close switch 24 before the effect of current passing through photoelectric cell 2 could have any effect on relay 19. In that event, switch 20 would be in circuit with switch 24 already moved to closed position by timer 18 and current would flow through fast coil 25 of motor 23. By the same mechanical linkage the setting of variable resistor 16 would be changed to decrease its resistance so as to increase current flow to vibratory feeder 15. Accordingly, where the timer period elapses before the scale pointer for the first time permits light to strike photoelectric cell 2, the speed of vibratory feeder is increased to cause more material to be fed to the scale in the predetermined period. Again, correction by means of coil 25 in motor 23 to variable resistor 16 will continue during the period of time between the closing of switch 24 and movement of switch 20 by relay 19 in series with photoelectric cell 2.

In any of the three situations just described, the passage of light to photoelectric cell 2 effectuated by the movement of scale pointer opens switch 17 to interrupt all current flow to vibratory feeder 15.

Controller 9 in the schematic arrangement of FIG. 1 represents the variable resistor 16 and rectifier 14 in FIG. 2. On the other hand, vibratory feeder 15 represented by a coil in FIG. 2 includes both vibratory feeder 8 and conveyor 10 in FIG. 1.

Various modifications and substitutions of equivalent components for those shown and described will occur to those persons skilled in the art. For example, rectifier 14 in FIG. 2 is included to allow current flow only on the positive portion of the cycle which is required only by certain vibratory feeders. Other commercially available vibratory feeders do not need rectifiers. Similarly, in place of a vibratory feeder one could use a screw conveyor, a bucket conveyor or a pneumatic conveyor, to consider a few alternatives. These, in that they are not dependent on a cyclical operation, would not require a rectifier. Where such conveyors are employed, the circuit containing the conveyor would include a starter coil and variable speed motor to operate the conveyor of choice.

In measuring amounts of liquid by weighing according to the concepts of this invention, the means for feeding material to the weighing device may not be anything more than a spigot, in which case a regulatable valve on the spigot is the equivalent of variable resistor, rectifier and vibratory feeder or such of these as may be used in a given system for handling solids.

In place of the two photoelectric cells mercury magnetic switches of the normally open type could be employed, these being operated by a small magnet on the scale pointer as the pointer moves successively past the switches.

Motor 23 in FIG. 2 is only representative of any variable source of mechanical power and could be replaced by either a pneumatic or hydraulic cylinder, for example. With suitable circuitry changes using reactance coils to electronically control current to the vibratory feeder, there would be no variable resistor and no moving parts required.

The fast feed rate is generally that at which the feeder is running at maximum speed, whereas the dribble or slow feed rate is adjustable according to the nature of the material as this affects accuracy in weighing. Where tests show, for example, that the desired degree of accuracy in weighing is achieved when dribble feed rate is one pound of material per second, the dribble feed might be set to move five pounds of material by appropriate placing of the photoelectric cells on the scale face. Dribble feed time would accordingly be five seconds and the timer would, therefore, be set or selected to time that period.

For the reason that the fast feed rate is usually the maximum speed attainable, there is usually no need to regulate it and, therefore, the equipment and method described have been in terms of dribble feed rate compensation only. However, the same equipment, with the necessary additional items such as timer, photocells and variable current regulator, the same method could apply to control the rate of the fast feed.

From the description of the invention it can be seen that this combination of controlling elements and the corresponding method produces not just a change in weighing but a change which is both variable and dependent on error in the previous weighing cycle.

Having thus described my invention, I claim:

1. In a feed rate compensation system for automatic repeated weighing of an established amount of material the combination of:
    (1) a weighing device,
    (2) means for feeding material to said weighing device,
    (3) a timer setting a final slow feed rate period of operation of said means for feeding material, and
    (4) means actuated by said weighing device during the final slow feed rate period of operation for varying during a succeeding final slow feed rate period of operation the feed rate of said means for feeding material to said weighing device.

2. A feed rate compensation system for automatic repeated weighing of an established amount of material the combination of:
    (1) a weighing device,
    (2) means for feeding material to said weighing device,
    (3) timers setting separate periods of fast and slow operation of said means for feeding material,
    (4) variable current regulators,
    (5) variable speed power means to control the setting of said variable current regulators, and
    (6) means actuated by said weighing device to control current flow to said variable speed power means, whereby the feed rate of said means for feeding material to said weighing device is varied during a succeeding period of weighing.

3. In a feed rate compensation system for automatic repeated weighing of an established amount of material the combination of:
    (1) a weighing device,
    (2) means for feeding material to said weighing device,
    (3) a timer setting a final slow feed rate period of operation of said means for feeding material,
    (4) a variable current regulator,
    (5) a variable speed power means to control the setting of said variable current regulators, and (6) means actuated by said weighing device to control current flow to said variable speed power means, whereby the feed rate of said means for feeding material to said weighing device is varied during a succeeding period of weighing.

4. A method of repeatedly weighing essentially identical amounts of material from a supply source which comprises:
(1) moving the material to a conveyor in motion,
(2) loading the material from said conveyor onto a weighing device,
(3) fixing a period of time for the final slow feed rate loading of material onto said weighing device, and
(4) using the motion of said weighing device in said period of time fixed for final show feed rate loading to control automatic means for regulating the motion of said conveyor.

References Cited in the file of this patent

UNITED STATES PATENTS

| | | |
|---|---|---|
| 2,544,155 | Harkenrider | Mar. 6, 1951 |
| 2,597,831 | Willis | May 20, 1952 |
| 2,933,281 | Hyde | Apr. 19, 1960 |